(12) United States Patent
Vodermayer et al.

(10) Patent No.: US 6,528,611 B2
(45) Date of Patent: Mar. 4, 2003

(54) METHOD FOR FORMING A FINELY DIVIDED POLYMERIZATE

(75) Inventors: Albert Maria Vodermayer, Dietlikon (CH); Lothar Kuhnert, Berlin (DE)

(73) Assignee: Arova Schaffhausen AG (CH)

( * ) Notice: Subject to any disclaimer, the term of this patent is extended or adjusted under 35 U.S.C. 154(b) by 0 days.

(21) Appl. No.: 09/974,661

(22) Filed: Oct. 11, 2001

(65) Prior Publication Data

US 2002/0045725 A1 Apr. 18, 2002

(30) Foreign Application Priority Data

Oct. 13, 2000 (EP) .............................. 00810945

(51) Int. Cl.$^7$ .............................................. C08G 64/00
(52) U.S. Cl. ..................... 528/196; 528/176; 528/198; 528/271; 528/272
(58) Field of Search ................. 528/176, 196, 528/198, 271, 272

(56) References Cited

U.S. PATENT DOCUMENTS

| | | |
|---|---|---|
| 3,267,074 A | 8/1966 | Wood |
| 3,954,713 A | 5/1976 | Schnöring et al. |
| 4,089,843 A | 5/1978 | Rausch, Jr. |
| 4,452,976 A | 6/1984 | Kohyama et al. |
| 4,546,172 A | 10/1985 | Kohyama et al. |

FOREIGN PATENT DOCUMENTS

| | | |
|---|---|---|
| DE | 4121915 A1 | 1/1993 |
| EP | 0 499 072 A1 | 8/1992 |
| JP | 57209932 A1 | 12/1982 |
| JP | 9040785 A1 | 2/1997 |

*Primary Examiner*—Terressa M. Boykin
(74) *Attorney, Agent, or Firm*—Townsend and Townsend and Crew LLP

(57) ABSTRACT

The method for forming a finely divided polymerizate in the form of a dispersion (D) of particles (50, 51) for the purpose of manufacturing powder lacquers or fiber compound materials comprises two steps:

Figure 1:
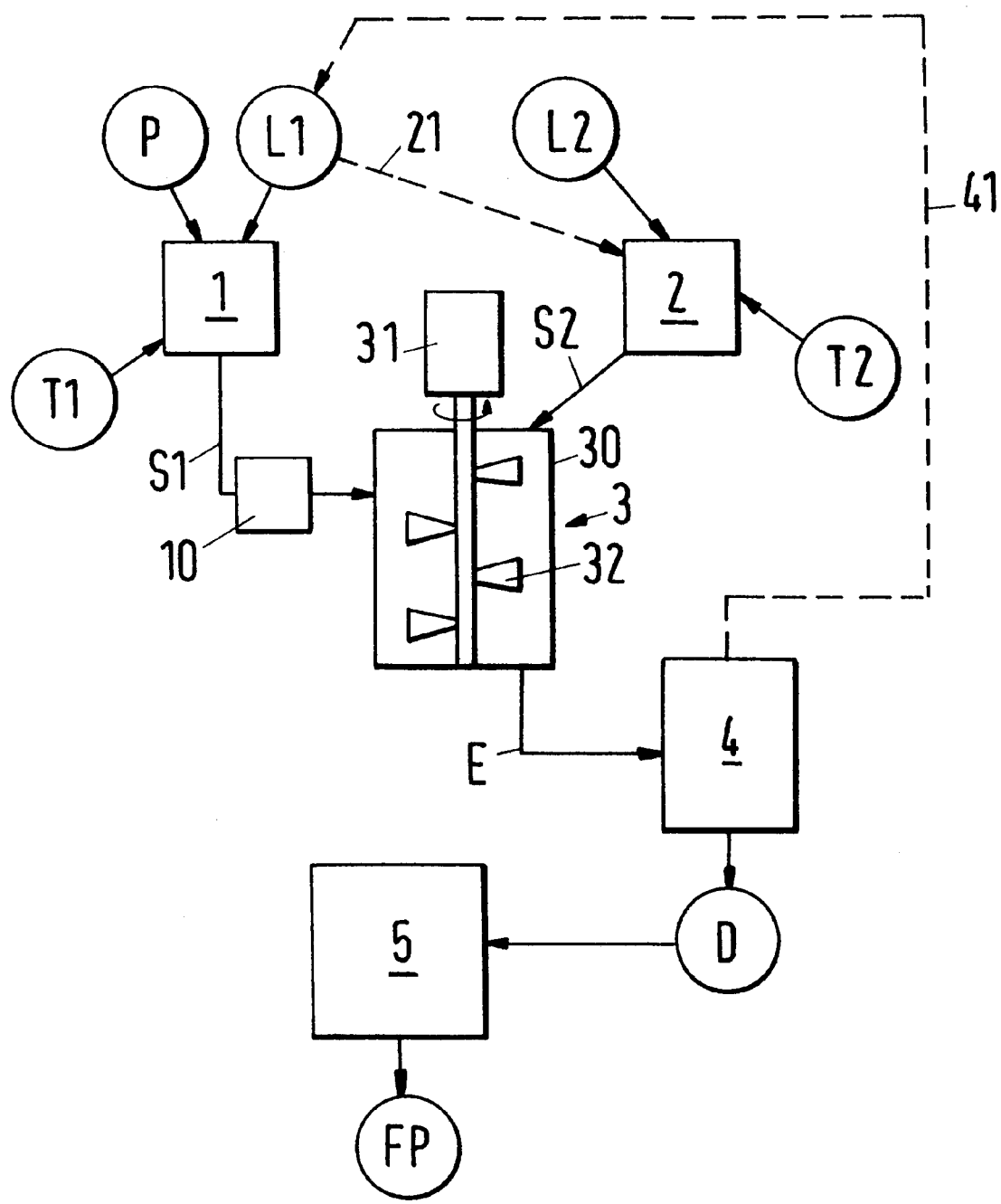

1) In a first step a solution (S1) of a polymer (P), which is dissolved in a first liquid (L1), is emulsified in a second liquid (L2). The polymer is not soluble in the second liquid. The first liquid has a lower boiling point than the second and it is soluble in the second only to a limited extent. Owing to the limited solubility the polymer remains dissolved in the droplets which arise during the emulsification. Under the influence of mechanical means—in particular of a high speed stirring apparatus (31, 32)—and by shear forces caused by the latter, droplets are formed, the average diameter (d) of which corresponds to one of the named uses and is preferably less than 0.03 mm.

2) In a second step the first liquid is removed by distillation from the mixture while retaining the emulsion (E), so that the polymer solidifies in the form of particles, in particular spheroid polymer particles.

14 Claims, 2 Drawing Sheets

METHOD FOR FORMING A FINELY DIVIDED POLYMERIZATE

The invention relates to a method for forming a finely divided polymerizate, further to a fine powder consisting of a finely divided polymerizate of this kind as well as to a use of the fine powder.

In the manufacture for example of fiber compound materials, in particular of unidirectionally fiber reinforced thermoplastics, or of powder lacquers, polymerizate particles are required which are finely divided and which consist of so-called high performance polymers. Three kinds of method are known for producing a fine powder which consists of a finely divided polymerizate: 1. grinding, which is particularly suitable for crystalline polymers (e.g. PPS or PEEK).—2. Dispersion polymerization or dispersion polycondensation, in which a polymer in the form of a finely divided powder arises (e.g. polyamide). 3.—Subsequent dispersion of polymerizates, with particles being produced by means of spraying, reprecipitating or emulsification or also combinations of method steps of this kind.

The object of the invention is to create a method for the particular polymer polyetherimide, which has an amorphous, i.e. non crystalline form, or similar polymers such as for example polycarbonate, polyamidimide or polyethyleneterephthalate in which a finely divided polymerizate arises which is suitable for the manufacture of fiber compound materials by means of pressure impregnation of strands which are formed of endless fibers. This object is satisfied by the method which is defined in claim 1.

The method for forming a finely divided polymerizate in the form of a dispersion of particles—for the purpose of manufacturing powder lacquers or fiber compound materials—comprises two steps:

1) In a first step a solution of a polymer, which is dissolved in a first liquid, is emulsified in a second liquid. The polymer is not soluble in the second liquid. The first liquid has a lower boiling point than the second and it is soluble in the second only to a limited extent. Owing to the limited solubility the polymer remains dissolved in the droplets which arise during the emulsification. Under the influence of mechanical means—in particular of a high speed stirring apparatus—and by shear forces caused by the latter, droplets are formed, the average diameter of which corresponds to one of the named uses and is preferably less than 0.03 mm.
2) In a second step the first liquid is removed by distillation from the mixture while retaining the emulsion, so that the polymer solidifies in the form of particles, in particular spheroid polymer particles.

Subordinate claims 2 to 8 relate to advantageous embodiments of the method in accordance with the invention. The subjects of claims 9 and 10 are a fine powder and a use of a dispersion of finely divided polymer particles in the manufacture of fiber compound materials respectively.

Figure 2:
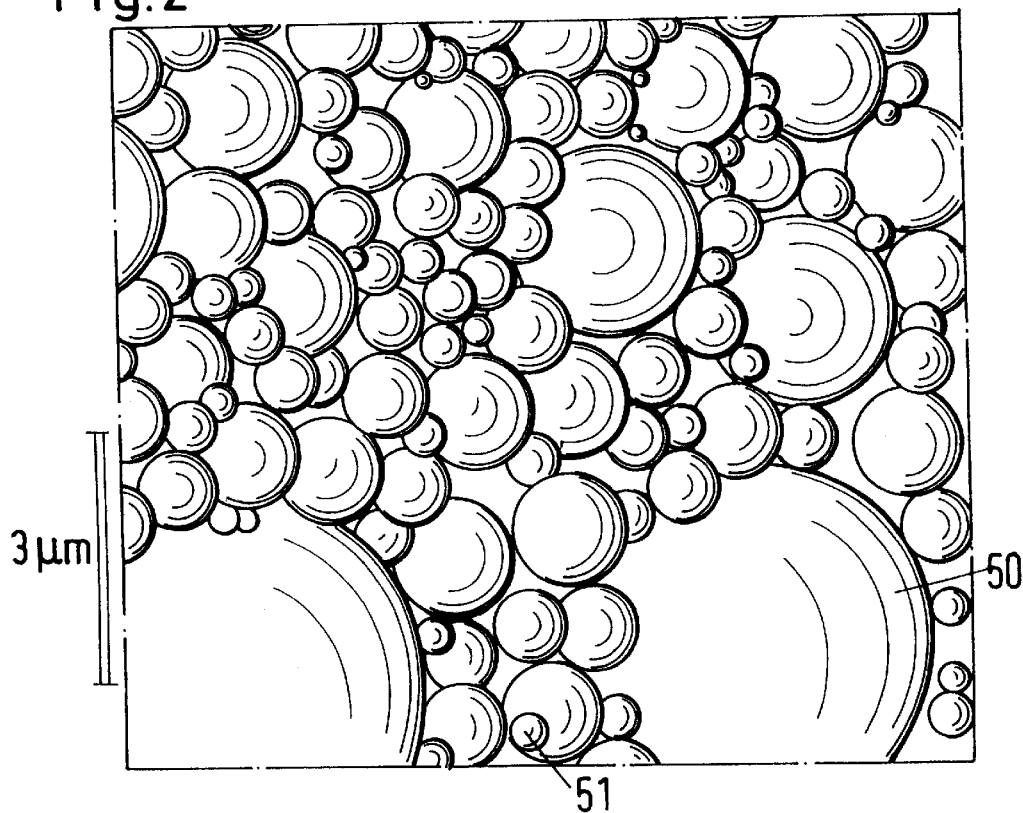
Figure 3:
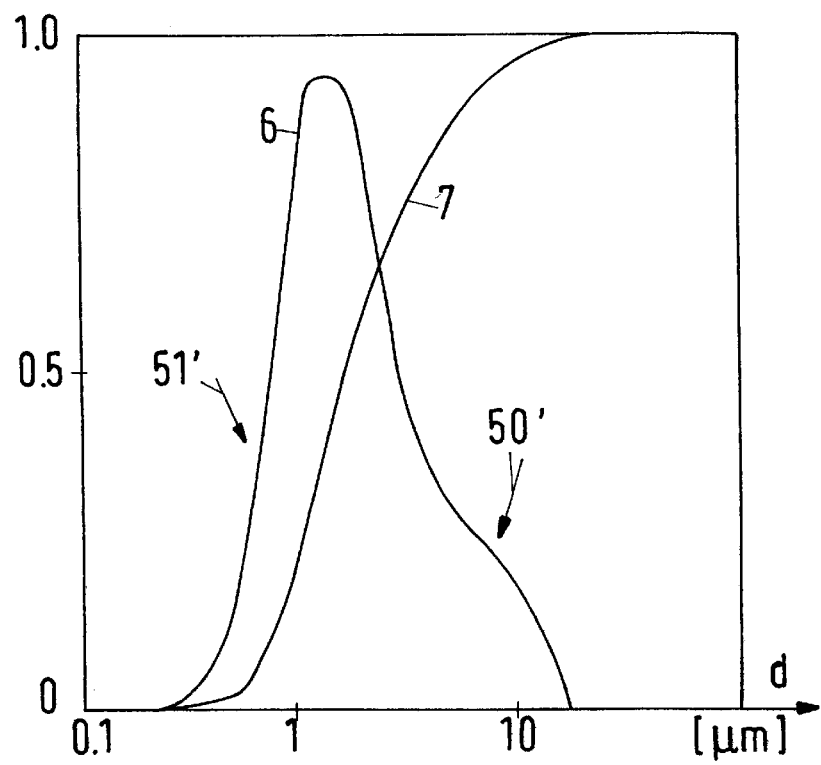

The invention will be explained in the following with reference to the drawings. Shown are:

FIG. 1 a block diagram for illustrating the method in accordance with the invention;

FIG. 2 a drawing from a REM photograph which illustrates a sample of the product which is formed using the method in accordance with the invention, namely finely divided polyetherimide, and FIG. 3 a size distribution of the polymer particles which has been measured for the polyetherimide sample of FIG. 2.

The plant which is schematically illustrated in FIG. 1 comprises diverse components 1, 2, 3, 4, and 5, by means of which the method in accordance with the invention can be carried out. In a mixer 1 a polymer, namely polyetherimide, is admixed as a solid polymerizate P to a first liquid L1 (e.g. methylene chloride $CH_2Cl_2$) and is dissolved in the latter. A first tenside T1 can be admixed to the solution SI which is won therein. A second mixer 2 is provided in which a second liquid L2 (e.g. water) can be mixed with a second tenside T2, with a solution S2 arising.

The solution S1 is fed in by means of a feed-in member 10 into the solution S2 and emulsified in the latter in a device 3. The emulsification device 3 is a vessel 30 with a stirring apparatus which comprises a drive 31 and a rotor 32. The vessel 30 can also contain stator elements, which are not illustrated. In the first stage, which is formed by the components 1 to 3, an emulsion E is formed, which is largely stable as a result of the tensides T1 and T2, which have the function of emulsion expedients, so that droplets of the emulsion E do not coalesce. The polymer P is not soluble in the second liquid L2. The first liquid L1 has a lower boiling point than the second (e.g. the boiling point of methylene chloride amounts to 42°); and the first liquid L1 is soluble only to a limited extent in the second, so that the polymer P remains dissolved in the droplets which have arisen during the emulsification. Under the influence of the rotor 32 as well as of a stator where appropriate and by the shear forces which are caused by them, droplets are produced, the average diameter of which must correspond to the purpose of the polymer particles to be formed (manufacture of powder lacquers or fiber compound materials). This is achieved with a rotational speed of 6000 rotations per minute (=rpm), which can be realized by a high speed stirring apparatus. For the manufacture of a fiber compound material, in which strands of endless fibers are treated by means of a pressure impregnation (cf. e.g. DE-A 41 21 915), the average diameter of the polymer particles should not be greater or substantially greater than the fiber diameter.

For carrying out the second method step the emulsion E is fed in into a vaporizing device 4 in which the first liquid L1 is distilled off from the droplets, with a portion of the liquid L2 also being vaporized. In this the polymer P which is dissolved in the liquid L1 precipitates and solidifies to spheroid particles 50, 51 (see FIG. 2). Together with the remaining liquid L2 the polymer particles 50, 51 form a dispersion D. The vaporized off liquid L1 is advantageously recycled, which is indicated in FIG. 1 by the broken connection line 41.

In a third method step—carried out in the plant component 5—a powder, namely a fine powder FP, can be produced from the dispersion D through filtering, washing and drying. For the filtering for example a pressure filter can be used. The washing is advantageously carried out a plurality of times.

If the first liquid L1 is partly soluble in the second liquid L2, then an additional amount of first liquid L1 is advantageously admixed in the mixer 2 (connection 21) and dissolved in the liquid L2, with in particular a maximum amount of the first liquid L1 being used in order to obtain a saturated solution.

The fine powder FP of polyetherimide which is illustrated in FIG. 2 and which is drawn in a simplified manner from a raster electron microscopic photograph, consists of ball-like particles, large particles 50 and small particles 51. These spheroid polymer particles 50, 51 are distinguished by homogeneously structured, pore-less surfaces. Particles of other fine powders which are won through grinding have significantly differently structured surfaces: an irregularly formed, likewise non porous surface structure (e.g. polyphenylene sulfide—fortron) or a highly porous surface structure (e.g. polyamide powder). FIG. 3 shows the size distribution of the polymer particles which has been measured for the polyetherimide sample of FIG. 2 by means of a particle size analysis (sedimentation cell) and which illustrates a distribution of the particle diameters d in relation to the volume. Curve 6 indicates the density distribution, curve 7 the sum distribution. The regions of the curve 6 which indicate the density distribution of the large and small particles 50, 51 respectively are indicated by the arrows 50' and 51'. The average diameter has a value of 1.7 μm (measured as median 50 value $d_{50}$).

The method in accordance with the invention can also be carried out with polycarbonate, polyamidimide or polyethyleneterephthalate or a mixture of these substances instead of with the polymer polyetherimide. Fine powders consisting of one of the named polymers are characterized by spheroid polymer particles having an average diameter of 0.5 to 100 μm. In this the volume distribution which is illustrated with reference to FIG. 3 is made the basis of the definition of the average diameter. Average diameters less than 10 μm are advantageous for the manufacture of fiber compound materials.

The fine powder FP which is illustrated in FIG. 2 was produced using the following two solutions S1 and S2:

Solution S1: 20 g of polyetherimide (Ultem™) and 1 g of Triton X-100 in 100 ml of methylene chloride.

Solution S2: 5 g of sodium dodecyl sulfate in 300 ml of water which is saturated with methylene chloride.

The tensides Tenside T1 and T2 (Triton™ X-100 and sodium dodecyl sulfate respectively) which are used are soluble in the first liquid L1 (methylene chloride) and in the second liquid L2 (water) respectively.

The solution S1 is added to the solution S2 relatively slowly—for about 30 s—and emulsified for a further 60 s using a high speed stirrer (approximately 6000 rpm). A milky emulsion a rises. The methylene chloride is distilled off out of the latter in a rotary vaporizer for example with the application of a vacuum. (There is also the possibility of using a falling film vaporizer.) The polymer powder is isolated through filtering, with a pressure filter advantageously being used and the filtrate being washed with water a plurality of times. Finally the washed filtrate is dried, with the fine powder FP a rising.

For the manufacture of a fiber compound material the fine powder FP is re-dispersed in water, for example in accordance with the following prescription: 100 g of polyetherimide fine powder FP, 1 g of Cremophor™ A 25 (a tenside) and 1000 ml of water.

For the emulsification, which is carried out in the first step of the method in accordance with the invention, the following holds more generally: The polymer solution S1 is added into the stirred second liquid L2 (or the solution S2) relatively slowly—slowly with respect to the stirring time—and in particular during the first third of the stirring time. A duration in the range between 30 s and 300 s, preferably a maximum of 60 s, is provided for the stirring time. Droplets, the average diameter of which is preferably less than 0.03 mm, are produced under the influence of the shear forces which are caused by the stirrer. It is possible to produce a polymer solution S1, the polymer proportion of which amounts to 30% by weight, from polyetherimide and methylene chloride. The viscosity increases with increasing polymer proportion. In order that an emulsion with very small droplets forms, the viscosity of the solution S1 must not differ substantially from that of the solution S2. On the other hand as much polymer as possible should be dissolved in the first liquid L1 in order that a large amount of fine powder can be produced with a small amount of solvent L1. From a test series it was seen that the proportion of polyetherimide in the methylene chloride solution S1 preferably amounts to approximately 20 % by weight.

The emulsification can also be carried out using other mechanical means than a high speed stirrer (at a speed of rotation of about 5000 to 7000 rpm and producing chargewise in each case at least 1 liter of emulsion. For example the following possibility is conceivable: The polymer solution S1 is injected into a flowing solution S2 in the form of thin flow filaments through a large number of fine nozzles; immediately after the injection the mixture is passed through static mixers in which the flow filaments of the polymer solution SI decompose into droplets. The dispersion D can be used directly for the manufacture of a unidirectionally fiber reinforced thermoplastic, with this fiber compound material being manufactured by means of a pressure impregnation of strands which are formed of endless fibers and with the average diameter of the polymer particles 50, 51 being smaller than the fiber diameter.

What is claimed is:

1. Method for forming a finely divided dispersion of polyetherimide particles, the dispersion or the particles being suitable for the purpose of manufacturing powder lacquers or fiber compound materials, said method comprising:

(a) providing a solution of polyetherimide in a first liquid;

(b) forming an emulsion of the polyetherimide solution of step (a) in a second liquid in which the polyetherimide is not soluble by adding the polyetherimide solution to the second liquid, the first liquid having a lower boiling point than the second liquid and being soluble in the second liquid only to a limited extent, so that the polyetherimide remains dissolved in the droplets of the first liquid formed in the emulsification;

the emulsion being formed by adding the polyetherimide solution of step (a) to the second liquid and stirring the mixture at a speed of from about 5000 to about 7000 rpm for a time of from about 30 to about 300 seconds;

the polyetherimide solution being added to the second liquid relatively slowly with respect to the stirring time; and (c) removing the first liquid from the emulsion by distillation, whereby the polyetherimide solidifies in the form of spheroidal particles, forming a dispersion of said particles in the second liquid.

2. A method in accordance with claim 1 further comprising recovering a powder comprising spheroidal polyetherimide particles from the dispersion of step (c).

3. A method in accordance with claim 1 in which one or more tensides that are soluble in the first and/or the second liquids respectively are mixed with one or both liquids prior to conducting the emulsification.

4. A method in accordance with claim 1 wherein the first liquid is partly soluble in the second liquid, and a sufficient amount of the first liquid is added to produce a saturated solution of the first liquid in the second liquid.

5. A method in accordance with claim 1 wherein the first liquid is methylene chloride and the second liquid is water.

6. A method in accordance with claim 1 wherein the stirring is conducted for a maximum time of 60 seconds.

7. A method in accordance with claim 1 wherein the polyetherimide solution contains less than 30% by weight polyetherimide.

8. A method in accordance with claim 1 wherein the solid polyetherimide particles have an average diameter of from 0.5 to 100 gm.

9. A method in accordance with claim 8 wherein the solid polyetherimide particles have an average diameter of less than 10 gm.

10. A method according to claim 1 in which the first liquid is added to the second liquid during the first ⅓ of the stirring time.

11. A method according to claim 1 further comprising using the dispersion of step (c) in the manufacture of a fiber compound material by means of a pressure impregnation of strands which are formed of endless fibers, with the average diameter of the polymer particles being less than the fiber diameter.

12. A method according to claim 2 further comprising using the powder in the manufacture of a powder lacquer.

13. A fine powder composition comprising spherical polyetherimide particles having an average diameter of 0.5 to 100 gm.

14. A dispersion of spherical polyetherpmide particles having an average diameter of 0.5 to 100 $\mu$m in a liquid in which the polyetherimide is insoluble.

* * * * *